(12) United States Patent
Schneider et al.

(10) Patent No.: US 12,246,603 B2
(45) Date of Patent: Mar. 11, 2025

(54) PROTECTIVE ELEMENT FOR A BATTERY PACK OF A HYBRID OR ELECTRIC VEHICLE AND PROCESS FOR THE ASSEMBLING OF A REINFORCED BATTERY PACK

(71) Applicant: ArcelorMittal, Luxembourg (LU)

(72) Inventors: Nicolas Schneider, Saint Martin Longueau (FR); Kévin Bardin, Chantilly (FR)

(73) Assignee: ArcelorMittal, Luxembourg (LU)

( * ) Notice: Subject to any disclaimer, the term of this patent is extended or adjusted under 35 U.S.C. 154(b) by 240 days.

(21) Appl. No.: 17/787,726

(22) PCT Filed: Dec. 15, 2020

(86) PCT No.: PCT/IB2020/061946
§ 371 (c)(1),
(2) Date: Jun. 21, 2022

(87) PCT Pub. No.: WO2021/130606
PCT Pub. Date: Jul. 1, 2021

(65) Prior Publication Data
US 2023/0081292 A1 Mar. 16, 2023

(30) Foreign Application Priority Data
Dec. 24, 2019 (WO) .............................. 2019/061330

(51) Int. Cl.
*B60L 50/64* (2019.01)
*B60K 1/04* (2019.01)
(Continued)

(52) U.S. Cl.
CPC ................ *B60L 50/64* (2019.02); *B60K 1/04* (2013.01); *B60L 58/26* (2019.02); *H01M 50/24* (2021.01);
(Continued)

(58) Field of Classification Search
CPC ........... B60L 50/64; B60L 58/26; B60K 1/04; B60K 2001/0438; B60K 2001/0472;
(Continued)

(56) References Cited

U.S. PATENT DOCUMENTS 8,967,312 B2 3/2015 Yanagi et al.
10,723,385 B2 * 7/2020 Ayukawa ........... B62D 25/2009
(Continued)

FOREIGN PATENT DOCUMENTS

CN 103568820 A 2/2014
CN 105098113 A * 11/2015 .............. B60L 50/64
(Continued)

OTHER PUBLICATIONS

Search Report of PCT/IB2020/061326 dated Oct. 13, 2020.
(Continued)

*Primary Examiner* — James A Shriver, II
*Assistant Examiner* — Michael T. Walsh
(74) *Attorney, Agent, or Firm* — Davidson Kappel LLC

(57) ABSTRACT

A protective element (1) named shield element for a battery pack of an electric or hybrid vehicle, wherein the protective element (1) includes a securing device (2) configured to removably secure the shield element (1) both to the battery pack and to a body (11) of the vehicle.

5 Claims, 2 Drawing Sheets

(51) Int. Cl.
    *B60L 58/26*      (2019.01)
    *H01M 50/24*      (2021.01)
    *H01M 50/242*     (2021.01)
    *H01M 50/276*     (2021.01)

(52) U.S. Cl.
    CPC ....... *H01M 50/242* (2021.01); *H01M 50/276* (2021.01); *B60K 2001/0438* (2013.01); *H01M 2220/20* (2013.01)

(58) Field of Classification Search
    CPC .. H01M 50/24; H01M 50/242; H01M 50/276; H01M 2220/20; H01M 50/20; H01M 50/249; B60Y 2306/01; B60Y 2200/91; B60Y 2200/92; Y02E 60/10; Y02T 10/70
    See application file for complete search history.

(56) References Cited

U.S. PATENT DOCUMENTS

| | | |
|---|---|---|
| 2012/0211128 A1 | 8/2012 | Corquillet et al. |
| 2013/0229030 A1 | 9/2013 | Yamaguchi et al. |
| 2015/0249240 A1* | 9/2015 | Hihara ................ H01M 8/2475 180/68.5 |
| 2015/0340671 A1 | 11/2015 | Subramanian et al. |
| 2016/0288737 A1 | 10/2016 | Kamimura et al. |
| 2017/0047623 A1 | 2/2017 | Kim et al. |
| 2018/0126835 A1* | 5/2018 | Saeki .................... B60N 2/005 |
| 2018/0171459 A1 | 6/2018 | Drillet et al. |
| 2018/0236863 A1* | 8/2018 | Kawabe .................. B60K 1/04 |
| 2019/0106765 A1 | 4/2019 | Moulin et al. |
| 2019/0210441 A1 | 7/2019 | Ovgard et al. |
| 2019/0237725 A1 | 8/2019 | Kawaguchi et al. |
| 2024/0347837 A1* | 10/2024 | Tang .................... H01M 50/244 |
| 2024/0356131 A1* | 10/2024 | Li ....................... H01M 50/224 |

FOREIGN PATENT DOCUMENTS

| | | | | |
|---|---|---|---|---|
| CN | 106274429 A | * | 1/2017 | |
| CN | 107732079 A | | 2/2018 | |
| DE | 102010011890 A1 | | 9/2011 | |
| DE | 102013215276 A1 | | 2/2014 | |
| DE | 102016115037 A1 | * | 2/2018 | .......... H01M 2/1072 |
| EP | 2070754 A1 | * | 6/2009 | ............... B60K 1/04 |
| EP | 2371599 A1 | * | 10/2011 | ............... B60K 1/04 |
| EP | 2685523 A1 | | 1/2014 | |
| JP | 2019147547 A | | 9/2019 | |
| WO | WO-2012063393 A1 | * | 5/2012 | ............... B60K 1/04 |
| WO | WO2017125809 A | | 7/2017 | |
| WO | WO-2017125809 A1 | * | 7/2017 | ........... B32B 15/013 |
| WO | WO 2018029168 | | 2/2018 | |
| WO | WO 2018/166888 | | 9/2018 | |
| WO | WO 2021/124012 A1 | | 6/2021 | |
| WO | WO 2021/130522 A1 | | 7/2021 | |

OTHER PUBLICATIONS

See written opinion of PCT/IB2020/061326.
ISR of PCT/IB2020/061946 dated Feb. 15, 2021.
Written opinion of ISA of PCT/IB2020/061946.
ISR of PCT/IB2020/061725 dated Feb. 2, 2021.
Written opinion of ISA of PCT/IB2020/061725.

* cited by examiner

PROTECTIVE ELEMENT FOR A BATTERY PACK OF A HYBRID OR ELECTRIC VEHICLE AND PROCESS FOR THE ASSEMBLING OF A REINFORCED BATTERY PACK

The present invention relates to protection and reinforcement elements in the car industry, and more specifically relates to the protection of a battery pack of an electric or hybrid vehicle.

BACKGROUND

Electrical vehicles or hybrid vehicles have to embed at least one heavy and bulky battery pack. This battery pack is made of a plurality of battery modules, each module housing several battery cells, that must be very well protected with a protective element named shield element both against physical intrusion that may occur during a car accident or during the normal use of the car through the intrusion of elements coming from the road. The battery modules also require protection against mechanical shock while the battery pack is moved during assembly to the considered vehicle.

To decrease cost of maintenance of the battery pack, the shield element is secured to the battery pack in a removable manner, for example with screws and nuts.

It is known from international patent application WO 2018/166888 to design a battery pack comprising a shield element removably secured to the enclosure of the battery pack.

SUMMARY OF THE INVENTION

However, providing a removable shield element in such a configuration may worsen the mechanical behavior of the battery pack secured to a body of the vehicle, and may induce undesirable mechanical vibrations.

It is an object of the present invention to provide a way to efficiently protect battery modules of the battery pack while optimizing the maintenance of the battery pack and its mechanical behavior when assembled to a hybrid or electric vehicle.

The present invention provides a protective element named shield element for a battery pack of an electric or hybrid vehicle, wherein said protective element comprises securing means configured to removably secure the shield element both to the battery pack and to a body of the vehicle.

The protective element according to the invention may also have the optional features listed below, considered individually or in combination:
  The securing means are managed at least at an edge portion of the protective element.
  The securing means comprise a first securing element provided to removably secure the protective element to the battery pack and a second securing element provided to removably secure the protective element and the battery pack to the body of the vehicle.
  Each securing element comprises at least a through hole managed in the protective element and a screw provided to be inserted through the considered hole.
  The protective element is extending in a plane and the distance between the first and second securing elements is lower than 15 cm, preferentially lower than 10 cm.

A second subject of the invention consists of a reinforced battery pack for an electric or hybrid vehicle comprising a carrier device, a plurality of battery modules housed in said carrier device, and at least a lower protective element named shield element as described above and provided to avoid intrusion into the battery pack, said carrier device lying on the protective element, wherein the securing means of the protective element are removably secured to the carrier device and are also configured to be secured to the body of the vehicle.

The reinforced battery pack according to the invention may also have the optional features listed below, considered individually or in combination:
  The carrier device comprises at least one side wall and a base wall provided to receive a plurality of battery modules of the battery pack, the side wall being inclined with respect to the base wall following a draft angle and enclosed in a location space delimited by two parallel planes both extending perpendicularly to said base wall, wherein the first securing element of the protective element is enclosed in said location space.
  The carrier device comprises a reinforcement hollow structure secured to the side wall and enclosed in the location space, and wherein the first securing element is secured to said reinforcement hollow structure.
  The reinforced battery pack further comprises at least:
    cooling means lying on the protective element and provided to cool down the battery modules, wherein the carrier device is lying on the cooling means,
    a top cover secured to the carrier device, and
    a mesh inserted in the carrier device, secured to said carrier device and comprising a plurality of housing crossmembers forming a plurality of housing members, each battery module being housed in a considered housing member.
  The reinforced battery pack comprises regularly spaced anti-intrusion crossmembers located between the protective element and the cooling means.
  The protective element is made of steel having a tensile strength greater than 1500 MPa.

A third subject of the invention consists of a vehicle comprising a body and at least an electric motorization, said vehicle further comprises a reinforced battery pack as described above, wherein the securing means of the protective element are secured both to the carrier device and to the body of the vehicle.

The vehicle according to the invention may also have the optional features listed below, considered individually or in combination:
  The first securing element of the protective element is secured in a reinforcement structure of the carrier device and is enclosed in the location space, and wherein the second securing element of the protective element is secured to the body of the vehicle.

Other characteristics and advantages of the invention will be described in greater detail in the following description.

BRIEF DESCRIPTION OF THE DRAWINGS

The invention will be better understood by reading the following description, which is provided purely for purposes of explanation and is in no way intended to be restrictive, with reference to.

DETAILED DESCRIPTION

Figure 1:
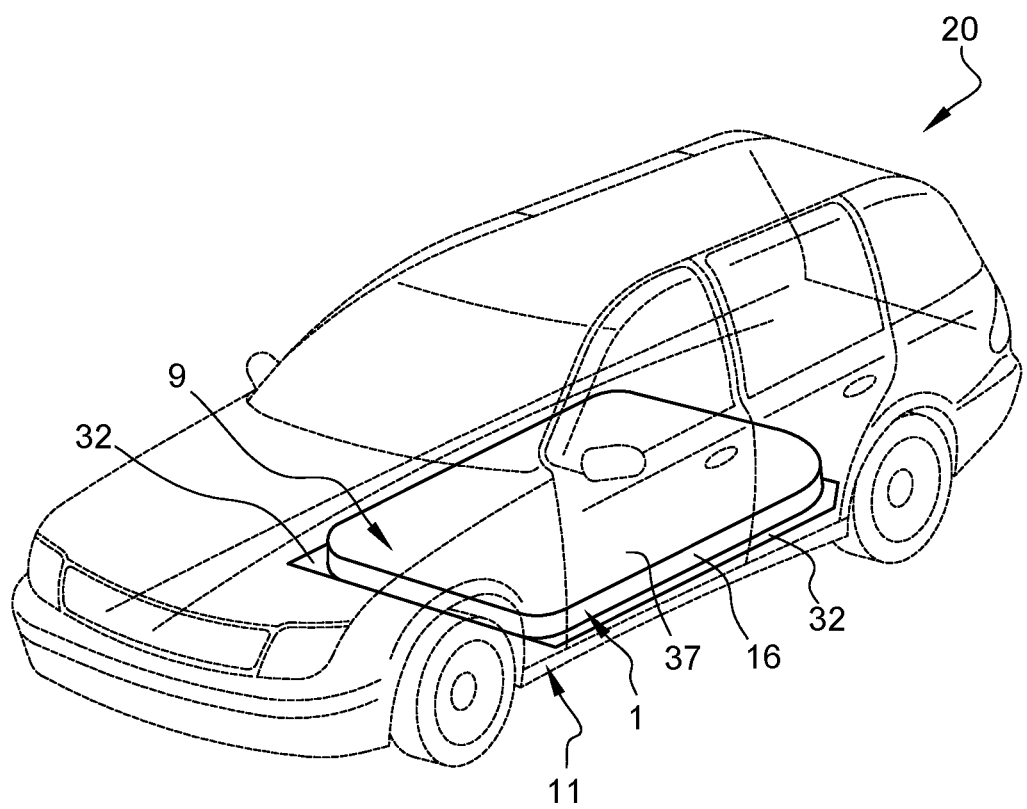
FIG. 1, which represents a perspective view of a body of a vehicle comprising a reinforced battery pack according to the invention.

It should be noted that the terms "lower", "upper", "above", "below", "lowest", "highest", "top", "bottom", "left", "right" as used in this application refer to the positions and orientations of the different parts of the reinforced carrier device, of the battery pack and of the vehicle when they are positioned vertically on the ground. Furthermore, the terms "front", "forward", "rear", "back", "backwards" are defined according to the normal driving direction of a vehicle. The terms "substantially perpendicular" define an angle of 90°+/−15° and the terms "substantially parallel" define an angle of 0°+/−15°.

According to FIGS. 1 and 2, an embodiment of the reinforced battery pack 9 including the protective element 1 of the invention will now be described.

The reinforced battery pack 9, which is a component of an electric or hybrid vehicle 20, essentially comprises a plurality of modules lying on a carrier device 10.

Several conceptions of the carrier device 10 are possible. For the purpose of exposing the current invention a carrier device 10 comprising a base wall 19 on which the battery modules lie, and several side walls 18 forming a frame at least surrounding the battery modules will be considered. However, it should be noted that it is also possible to implement the current invention with a carrier device having a different conception, for example a flat tray without side walls. The carrier device 10 has preferentially a general rectangular shape, extends regarding a longitudinal axis and comprises two longitudinal side walls 18 and two transverse side walls. However, this general shape may be different within the framework of the invention.

The carrier device 10 is for example made of steel and is manufactured by stamping a steel blank, preferably a steel having a tensile strength lower than 1000 MPa to make the stamping process easier. Because of the shape of the carrier device 10, and to allow demolding of the carrier device 10 after the stamping process, each side wall 18 of the carrier device is inclined with respect to the base wall 19 following a draft angle α. Each side walls 18 of the carrier device 10 is thus inclined with respect to the base wall 19 following said draft angle α and is enclosed in a space 17 delimited by two parallel planes P1, P2 both extending perpendicularly to said base wall 19. In the following, this space 17 will be named location space 17.

Figure 2:
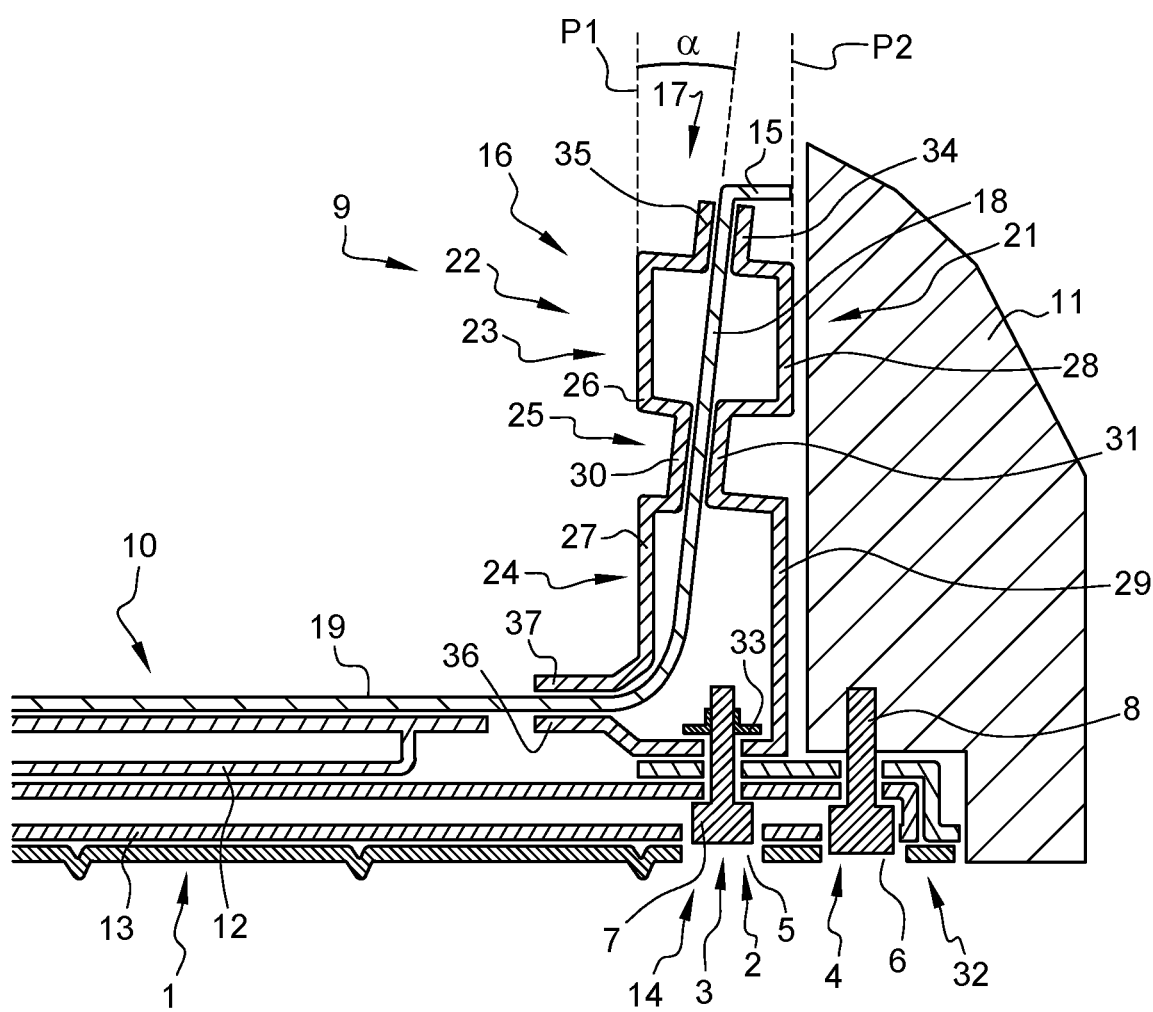
FIG. 2, which represents a transverse cross section of a part of the reinforced battery pack showing the protective element of the invention secured both to the battery pack and the body of the vehicle.

FIG. 2 depicts a longitudinal side wall 18 following arrow II in FIG. 1. The side wall comprises a free end portion that forms a flange 15 parallel to the base wall 19.

The carrier device 10 also comprises a reinforcement structure 16 of at least one of the side walls 18 of the carrier device 10. This reinforcement structure 16 comprises at least an inner reinforcement piece 22 and an outer reinforcement piece 21 extending along at least a part of the side wall 18. The inner and outer reinforcement pieces 21, 22 are respectively secured to opposite faces of at least the considered side wall 18, are at least partially facing each other and are preferentially facing each other.

In the following, a couple of inner and outer reinforcement pieces 21, 22 respectively secured to opposite faces of the considered side wall 18 and at least partially facing each other is named a reinforcement arrangement and is thus a part of the reinforcement structure 16, since said reinforcement structure 16 comprises several reinforcement arrangements.

FIG. 2 depicts a longitudinal reinforcement arrangement comprising two adjacent reinforcement hollow portions 23, 24 both being traversed by the considered side wall 18. In addition, each reinforcement hollow portion 23, 24 is made of an inner reinforcement hollow section 26, 27 of the considered inner reinforcement piece 22 and an outer reinforcement hollow section 28, 29 of the considered outer reinforcement piece 21, both reinforcement hollow sections 23, 24 being at least partially facing each other, and preferentially totally facing each other. Thanks to this specific arrangement, the two hollow portions 23, 24 are provided to absorb any shock against one or several side walls 18, avoiding any deformation of the carrier device 10.

Each reinforcement arrangement also comprises a reinforcement fastening portion 25 located between the reinforcement hollow portions 23, 24 and secured to the considered side wall 18. This reinforcement fastening portion 25 is made of an inner reinforcement fastening section 30 of the inner reinforcement piece 22 and an outer reinforcement fastening section 31 of the outer reinforcement piece 21, both reinforcement fastening sections 30, 31 being welded to the considered side wall 18. In addition, both reinforcement fastening sections 30, 31 are at least partially facing each other, and preferentially totally facing each other. Thanks to this specific arrangement, the volume of the two hollow portions 23, 24 is decreased to limit mechanical propagation through the modules of the reinforced battery pack. In other words, the reinforcement fastening portion 25 decrease the mechanical vibrations experienced by the battery modules.

Each reinforcement piece 21, 22 is manufactured by stamping a steel blank. In a particular embodiment, the stamping operation is a hot stamping operation in which the blank is heated and subsequently quenched in the stamping tool. It is thus possible to obtain the complex shapes needed for the part while ensuring high mechanical properties to ensure high resistance in case of shock. In an alternative embodiment, at least a part of the reinforcement pieces 21, 22 may be rollformed.

As an example, the inner and outer reinforcement pieces 21, 22 are made of martensitic steel having a tensile strength greater than 1500 MPa. The composition of this steel is for example in weight percentage:

| | |
|---|---|
| Carbon | Less than 0.28% |
| Manganese | Less than 2% |
| Silicon | Less than 1% |
| Chromium and molybdenum | Less than 1% |
| Titanium and niobium | Less than 0.15% |
| Aluminum | At least 0.010% |
| Sulfur | Less than 0.025% |
| Phosphorus | Less than 0.02% |
| Boron | Less than 0.01% |
| Copper | Less than 0.2% |
| Iron and inevitable impurities coming from the steelmaking process | Remaining |

In another embodiment, the inner and outer reinforcement pieces 21, 22 can be made with a harder martensitic steel having a tensile strength greater than 1700 MPa. The composition of this steel is for example in weight percentage:

| | |
|---|---|
| Carbon | Less than 0.35% |
| Manganese | Less than 3% |
| Silicon | Less than 1% |
| Chromium and molybdenum | Less than 1% |
| Titanium and niobium | Less than 0.15% |
| Aluminum | At least 0.010% |
| Sulfur | Less than 0.025% |
| Phosphorus | Less than 0.02% |

| | |
|---|---|
| Boron | Less than 0.01% |
| Copper | Less than 0.2% |
| Iron and inevitable impurities coming from the steelmaking process | Remaining |

These two examples of steel alloys have a strong rigidity, so that the reinforcement pieces 21, 22 offer protection against any deformation of the carrier device 10 or against any physical intrusion through the battery modules, despite the relative ductility of the carrier device 10.

The outer reinforcement pieces 21 of each arrangement comprise a first end portion 34 welded to the outer face of the corresponding side wall 18 of the carrier device 10, more precisely just below the flange 15 of said side wall 18. The outer piece 21 also comprise an opposite end portion 36 welded to the outer face of the base wall 19 of the carrier device 10, and two adjacent hollow sections 28, 29 with general trapezoidal shape.

The inner reinforcement piece 22 of each arrangement comprises a first end portion 35 welded to the inner face of the corresponding side wall 18 of the carrier device 10, facing the first end portion 34 of the outer reinforcement piece 21. The inner piece 22 also comprises an opposite end portion 37 welded to the inner face of the base wall 19 of the carrier device 10, and two adjacent hollow sections 26, 27 with general trapezoidal shape respectively facing the two hollow portions 28, 29 of the outer reinforcement piece 21. The inner reinforcement piece 22 also comprises an opposite end portion 37 welded to the inner face of the base wall 19 of the carrier device 10.

In an advantageous manner, the reinforcement hollow portions 23, 24 of the reinforcement arrangement are enclosed in the location space 17. Thanks to this specific disposition of the reinforcement hollow portions 23, 24, the total space allowed for the housing of the battery modules in the carrier device 10 is fully optimized.

Advantageously the reinforced battery pack 9 may comprise a mesh (not represented) inserted in the carrier device 10. This mesh is lying on the base wall 19 of the carrier device 10 and comprises a longitudinal member and a plurality of housing crossmembers secured to said longitudinal member. The housing crossmembers forms a plurality of regularly dispatched housing members each provided to house at least a battery module.

The reinforced battery pack 9 also comprises cooling means 12 secured to the outer face of the base wall 19 of the carrier device 10 and provided to cool down the battery modules.

According to the invention, the reinforced battery pack 9 comprises a lower protective element 1 named shield element in the following, said shield element 1 comprising securing means 2 removably secured to the carrier device 10 and also provided to be removably secured to a body 11 of the vehicle 20. Thus, the shield element 1 may be removed from the reinforced battery pack 9 if damaged to replace it by a brand-new shield element 1.

The carrier device 10 of the reinforced battery pack 9 is lying on said shield element 1 of the invention. In addition, the cooling means 12 are inserted between the carrier device 10 and the shield element 1.

This shield element 1 is square shaped and is extending in a plane following the same longitudinal axis than the carrier device 10. The shield element 1 is preferentially made of fully martensitic steel comprising between 0.15% and 0.5% of carbon in weight. This martensitic steel has a tensile strength greater than 1500 MPa, making the shield element 1 particularly resistant against physical intrusion through the reinforced battery pack 9.

The reinforced battery pack 9 also comprises regularly spaced anti-intrusion crossmembers 13 secured to the shield element 1 and located between said shield element 1 and the cooling means 12. In addition, the transverse housing cross members of the mesh described above are aligned with the anti-intrusion crossmembers 13, so that in case of an intrusion coming from the bottom of the vehicle 20, said anti-intrusion crossmembers 13 and transverse housing cross members collaborate together to provide optimal resistance.

Finally and as depicted in FIG. 1, the reinforced battery back 9 comprises a top plate 37 also named top cover that is secured to the flange 15 of the carrier device 10. In another and preferred embodiment, the top cover 37 may be secured to the carrier device 10 by bolting it to at least one housing crossmember of the mesh. In this last embodiment, it is possible to remove the top cover 37 in case maintenance of the battery modules or other elements is necessary.

According to the invention, the securing means 2 of the shield element 1 will now be described.

The securing means 2 are managed at least on an edge portion 14 of the shield element 1 and are preferentially managed at each end portion 14 of the shield element 1, assuming that the square shaped shield element 1 comprises four edge portions 14. As depicted in FIG. 2, at least two opposite edge portions 14 of the shield element 1 comprise each a protruding section 32 that extends beyond the flange 15 of the carrier device 10, said protruding sections 32 being provided to face the body 11 of the vehicle 20 as it will be explained in the following.

For each of the opposite edge portions 14, the securing means 2 comprise at least a first securing element 3, advantageously a plurality of first securing elements 3 that removably secure the shield element 1 to the carrier device 10, and a second securing element 4, advantageously a plurality of second securing elements 4 configured to secure the shield element 1 and the reinforced battery pack 9 to the body 11 of the vehicle 20.

Each first securing element 3 comprises a through hole 5 facing the outer piece 21 of the considered arrangement of the hollow structure 16 and a screw 7 inserted through said hole 5 and through a second hole managed in a bottom wall of the outer piece 21 of the reinforcement structure 16. The screw 7 is secured to the reinforcement structure 16 with a nut 33, to removably secure the shield element 1 to the battery pack.

Each first securing element 3 is thus enclosed in the location space 17, which optimizes the volume available for the battery modules lying on the base wall 19 of the carrier device 10.

Each second securing element 4 also comprises a through hole 6 managed in the protruding portion 32 of the considered edge portion 14, said through hole 6 being configured to face a hole managed in the body 11 of the vehicle 20, preferably a threaded hole. The second securing element 4 also comprises a screw 8 configured to be inserted in the threaded hole of the body 11 of the vehicle 20 to removably secure the shield element 1 and the reinforced battery pack 9 to the body 11 of the vehicle 20.

As depicted in FIG. 1, the reinforced battery pack 9 is removably secured to a lower part of the body 11 of the vehicle 20 to facilitate assembling and disassembling of said reinforced battery pack 9 to the vehicle 20. Thus, a vehicle can easily be equipped with the reinforced battery pack 9 of the invention by simply securing each second securing element 4 to the threaded hole of the body 11 of said vehicle 20. In addition, the reinforced battery pack 9 may easily be removed from the vehicle 20 by unscrewing each screw 8 of the considered second securing element 4.

As depicted in FIG. 2, the first and second securing elements 3, 4 of the securing means 2 are managed in the plane of the shield element 1, and the distance between said first and second securing elements 3, 4 is lower than 15 cm, preferentially lower than 10 cm. This specific disposition of the securing means 2 with a relatively low distance between the first and second securing elements 3, 4 allows a short vibration transmission path between the reinforced battery pack 9 and the body 11 of the vehicle 20. This results in a good Noise Vibration Harshness behavior, which is a key factor in driver satisfaction.

A process for the replacement of a damaged shield element of the reinforced battery pack 9 assembled to a hybrid or electric vehicle 20 will now be described.

In a first step, the screws 8 of the second securing elements 4 are removed from the body 11 of the vehicle 20 to disassemble the reinforced battery pack 9 from the vehicle 20. The reinforced battery pack 9 is thus removed from the vehicle 20 in a second step.

In a third step, the screws 7 of the first securing elements 3 are removed from the considered nuts 33 to free the damaged shield element from the rest of the reinforced battery pack 9. The damaged shield element is thus removed from the battery pack.

In a fourth step, a brand-new shield element 1 is positioned in front of the carrier device 10.

In a fifth step, the new shield element 1 is secured to the battery pack thanks to the first securing elements 3. The ready to use reinforced battery pack 9 is then reassembled.

Finally, in a sixth and last step, the ready to use reinforced battery pack 9 is positioned in front of the body 11 of the vehicle 20, and the screws 8 of the second securing elements 4 are inserted in the considered threaded holes manages in the body 11 of the vehicle 20 to removably secure the reinforced battery pack 9 to said vehicle 20.

Of course, the reinforced battery pack 9 is not limited to the embodiment described above, and modifications can be brought within the context of the invention. As an example, the top plate 37 may be optional and the cooling means 12 may be differently manufactured, as well as the carrier device 10 as it is mentioned above.

In addition, people skilled in the art understand that the shield element 1 according to the invention is suitable with any type of battery pack of a hybrid or electric vehicle 20, provided that said shield element 1 is configured to be secured to any part of the battery pack that could support assembling with the securing means 2.

What is claimed is:

1. A reinforced battery pack for an electric or hybrid vehicle, the reinforced battery pack comprising:
    a carrier device;
    a plurality of battery modules housed in the carrier device; and
    a lower protective element defining a shield element provided to avoid intrusion into the battery pack, the carrier device lying on the lower protective element, wherein securing means of the protective element being removably secured to the carrier device and are also configured to be secured to the body of the vehicle, the securing means including a first securing element provided to removably secure the lower protective element to the battery pack and a second securing element provided to removably secure the lower protective element and the battery pack to the body of the vehicle, each of the first and second securing elements including at least a through hole in the lower protective element and a screw provided to be inserted through the respective through hole;
    the carrier device including at least one side wall and a base wall provided to receive a plurality of battery modules of the battery pack, the side wall being inclined with respect to the base wall following a draft angle and enclosed in a location space delimited by two parallel planes both extending perpendicularly to said base wall, wherein the first securing element of the lower protective element is enclosed in the location space.

2. The reinforced battery pack as recited in claim 1 wherein the carrier device includes a reinforcement hollow structure secured to the side wall and enclosed in the location space, the first securing element secured to the reinforcement hollow structure.

3. The reinforced battery pack as recited in claim 1 further comprising:
    cooling means inserted between the carrier device and the protective element and provided to cool down the battery modules, the carrier device lying on the cooling means;
    a top cover secured to the carrier device; and
    a mesh inserted in the carrier device, secured to the carrier device and including a plurality of housing crossmembers forming a plurality of housing members, each battery module being housed in one of the respective housing members.

4. The reinforced battery pack as recited in claim 1 wherein the protective element is made of steel having a tensile strength greater than 1500 MPa.

5. A vehicle comprising:
    a body; and
    a reinforced battery pack as recited in claim 1 for providing electric motorization of the vehicle.

* * * * *